Aug. 18, 1931.  F. W. SPERR, JR  1,819,658
GAS PURIFICATION
Filed July 17, 1926
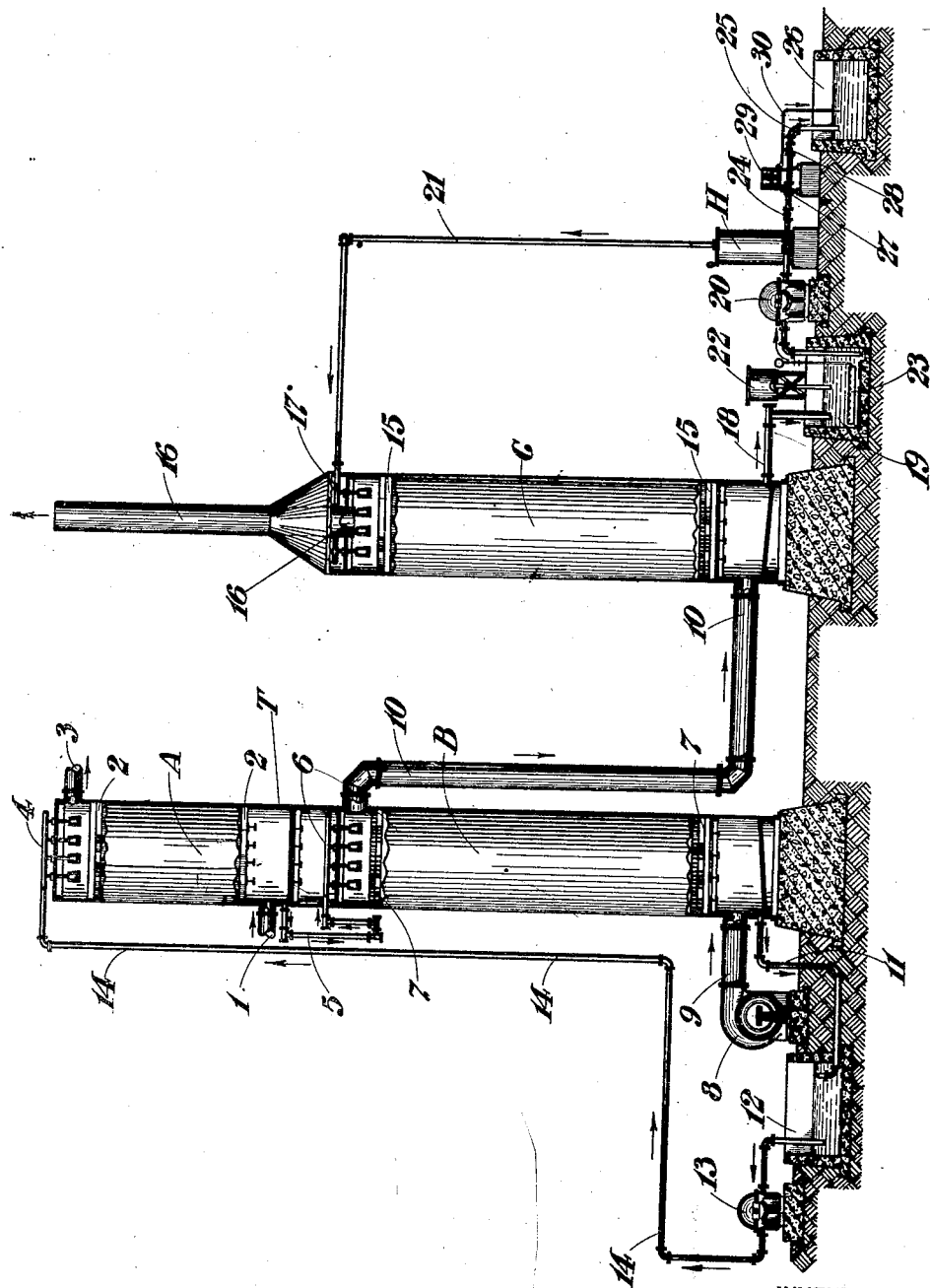
INVENTOR
Frederick W. Sperr Jr.
BY
Jesse R. Langley
ATTORNEY Patented Aug. 18, 1931

1,819,658

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

GAS PURIFICATION

Application filed July 17, 1926. Serial No. 123,166.

This invention relates to the purification of or removal of hydrogen sulphide from gases containing also carbon dioxide, and more particularly to purification effected by means of processes similar to those described and claimed in U. S. Letters Patent No. 1,389,980, of Charles J. Ramsburg, and No. 1,390,037, of David L. Jacobson, and wherein the hydrogen sulphide is separated from the bulk of the carbon dioxide in the gas by treating the latter with an alkaline absorbent solution, and subsequently regenerating or actifying the thereby fouled solution by aeration out of contact with the gas.

An object of my invention is to provide a means for purifying the air used in the actification stage of processes of the nature indicated above, or other gases containing hydrogen sulphide with relatively small amounts of carbon dioxide.

In the process of the present invention, as in the Ramsburg and Jacobson processes, the removal of hydrogen cyanide is incidentally effected.

An object of my invention is to accomplish the fixation of sulphur in such form as to avoid the emission of hydrogen sulphide into the atmosphere, as, for example, occurs in the usual practice of the prior patents hereinabove referred to.

A further object of my invention is to make possible the fixation of the sulphur by means of relatively cheap and readily obtainable absorption agents, assisted by the presence of catalytic and/or accelerative means whereby the consumption of said agent or agents may be materially lessened.

The agents which I propose comprise aqueous suspensions of alkaline earths, such, for example, as lime and/or magnesia, both of which are cheaper than sodium carbonate or ammonia, the alkalies generally used in gas purification.

Lime and magnesia, in solid form, have been used for gas purification, but have been almost universally replaced by iron oxide or liquid purification with sodium carbonate or ammonia as alkaline absorbent agent. The employment of lime and magnesia in aqueous suspension has been proposed, but has failed of success because the relatively large amount of carbon dioxide present in fuel gases caused serious losses of the absorbent agents, due to the resultant formation of insoluble and inactive carbonates.

I have found that in the Jacobson and Ramsburg processes above referred to, the amount of carbon dioxide in the actifier air is small in comparison with the amount of carbon dioxide usually present in the gases that are being purified. For example, in the treatment of coke oven gas containing 2.0% of $CO_2$, from 0.1 to 0.2% of $CO_2$ is removed so that the actifier air carries less than 0.1% of $CO_2$. In gases containing larger amounts of $CO_2$, the percentage of $CO_2$ in the actifier air is increased somewhat but is always much smaller than that in the gas. In other words, these processes act as effective means for separating $H_2S$ from $CO_2$, because the efficiency of $H_2S$ removal is usually about 90%, whereas the amount of $CO_2$ removed is 10% or less.

This separation makes it possible to apply to the actifier air methods for the extraction of hydrogen sulphide which would not be feasible when applied to the original gas on account of the presence of carbon dioxide. For example, it would not be economical to use a suspension of lime for treatment of gas containing 2% of $CO_2$ because this would entail the consumption of approximately 3 lbs. of lime (CaO) per thousand cubic feet on account of the formation of calcium carbonate; but if such gas were treated by the Jacobson or Ramsburg processes for the removal of hydrogen sulphide, the resulting actifier air could be economically treated with lime; first, because the amount of calcium carbonate formed would be so small as to consume less than 0.20 lbs. of lime per thousand cubic feet of the original gas purified; and second, because the lime requirement for the fixation of hydrogen sulphide would be comparatively small on account of considerations hereinafter shown.

When a lime suspension carrying sulphur compounds resulting from reactions with hydrogen sulphide is aerated in the presence of small amounts of certain compounds, such as the sulphides of cobalt, nickel or iron, these exert what is probably a catalytic effect upon the oxidation reactions resulting from aeration, resulting in the formation of calcium thiosulphate as end product. In the absence of such compounds, aeration would merely expel hydrogen sulphide. The same compounds, in substantially increased amount, tend to cause the liberation of free sulphur, in addition to the formation of thiosulphate. The cobalt, iron, or nickel may be present in the form of sulphide, oxide, or hydrate, either in suspension or solution. The use of such compounds in limited amount to promote the formation of alkali thiosulphate is broadly described and claimed in my copending application Serial No. 124,556, filed July 24, 1926.

From a comparison of the formulæ of calcium thiosulphate ($CaS_2O_3$) and calcium sulphide ($CaS$), it will be seen that, in the form of thiosulphate, a unit of calcium combines with two units of sulphur, whereas, in the sulphide form, one unit of calcium combines with one of sulphur. In my process, this becomes highly important because the discarding of the end product, calcium thiosulphate, removes twice as much sulphur per unit of calcium lost as is the case when calcium sulphide is the end product.

In addition to the general objects recited above, the invention has, for further objects, such other improvements in operative advantages or results as may be found to obtain in the following description and claims.

The accompanying figure shows an elevational view of apparatus for the purification of fuel gas and the subsequent purification of the actifier air used for regeneration of the spent solutions that have been used in such purification.

With reference to the figure, the absorption and actification stages of a process for the liquid purification of fuel gas are conducted in a tower T, that is comprised of an upper absorption chamber A and a lower actification chamber B. Such apparatus is particularly related to the above-mentioned Ramsburg and Jacobson processes and is described and claimed in the U. S. Letters Patent to Eugene H. Bird, No. 1,478,543. The fuel gas to be purified enters the lower portion of the chamber A that is filled with permeable contact material 2 and rises upwardly through the same in intimate contact with a downwardly flowing solution of sodium carbonate and escapes in purified condition into a conduit 3. The sodium carbonate solution is introduced to the upper portion of the chamber A through a spray system 4, and, after passing downwardly through the contact means 2, in contact with the gas, and thereupon absorbing hydrogen sulphide therefrom, collects in the lower portion of chamber A and passes through a sealed conduit 5 into a further spray system 6, which distributes it over permeable contact means 7 within the actification chamber B.

For the actification and regeneration of this spent solution, air is blown from a blower 8 and a conduit 9 and passes upwardly through the lower portion of chamber B in counter-current with the solution. This air does not enter into the reactions of regeneration, but is effective in removing hydrogen sulphide and causing the formation of sodium carbonate. The fouled actifier air leaves chamber B, through a conduit 10, and the regenerated solution passes through a line 11 into a sump 12, from which it is forced, by a pump 13, through a line 14 and the sprays 4 into the chamber A, thus completing and recommencing the cycle.

The actifier air, now laden with hydrogen sulphide, but relatively free from carbon dioxide, passes through a conduit 10 into the lower portion of a purification chamber C, the interior of which is filled with permeable contact means 15, through which the said air rises to escape in purified condition through a stack 16 into the atmosphere. An absorbent liquid, consisting of a suspension of 1 to 3% of lime or magnesia, and containing cobalt sulphide equivalent to less than 0.10 of metallic cobalt, and ordinarily about 0.01% of metallic cobalt, preferably at a temperature above 85 degrees Fahrenheit, is introduced to the upper portion of the purification chamber C through a spray system 17 and passes downwardly, in counter-current with the ascending air, absorbing noxious impurities therefrom, and passes through a line 18 into a sump 19, from which it is continuously forced by a pump 20 through a heater H and a line 21 and the sprays 17 into the purification chamber C. Additions of lime or other requisite material are made as necessary from a supply tank 22. A convenient means for making such additions is described and claimed in the copending application for U. S. Letters Patent of Gilbert A. Bragg, Serial No. 116,825, filed June 18, 1926.

Through contact of the air containing hydrogen sulphide with lime in the presence of the catalytic agent, calcium thiosulphate is formed and, being relatively very soluble, accumulates in the solution, portions of which are discarded from time to time, as will be hereinafter described. Some calcium hydrosulphide or other calcium-sulphur compounds may also be formed. The oxidation of these to thiosulphate is completed, if necessary, by aerating the suspension in the sump 19, for which agitation means are provided. Such means may consist of one or more foraminous tubes 23 supplied with compressed air. Some free sulphur may be liberated as a consequence of such agitation, but, with the proper amount of catalyst present and with the proper temperature, substantially all of the sulphur present is converted to calcium thiosulphate.

As the thiosulphate builds up in the absorption liquid, the usefulness of the latter is impaired. Portions may be discarded from time to time as desired by opening a valve 24 and allowing the liquid to flow under the action of pump 20 through a line 25 into a sump 26, or, by opening a valve 27 and closing a valve 28, the liquid may be passed through a filter press 29, wherein the suspended material may be retained. The filtrate from the press 29 is discarded through a line 30 into the sump 26. The suspended material, consisting, in the main, of lime or magnesia, and the catalytic and/or accelerative compound or compounds previously described, is returned to the system as desired.

While I have described my invention with reference to the initial purification of fuel gas with a sodium carbonate solution, it will be seen that, in the case of gases, such as oil gas, containing relatively little or no carbon dioxide, this initial purificaton stage may be omitted and purification by means of the lime or magnesia suspensions may be directly resorted to with favorable results. My invention is, therefore, not limited to the specific example hereinabove recited by way of illustration, but may be variously embodied within the scope of the following claims.

I claim as my invention:

1. The process of removing hydrogen sulphide from gas containing also carbon dioxide, which comprises transferring the hydrogen sulphide, but substantially no carbon dioxide to a current of air and subjecting said air to intimate contact with an aqueous suspension of an alkaline earth.

2. The process of removing hydrogen sulphide from gas containing also carbon dioxide, which comprises transferring the hydrogen sulphide to a current of air containing substantially less carbon dioxide than said gas and subjecting said air to intimate contact with an aqueous suspension of an alkaline earth.

3. The process of purifying gas containing substantially no carbon dioxide, which comprises subjecting said gas to contact with a liquid containing from 1 to 3% of lime, at a temperature above 85 F.

4. The process for purification of gas which comprises subjecting said gas to intimate contact with an aqueous suspension of an alkaline earth and a compound of a metal of the group consisting of iron, nickle and cobalt and capable of causing the absorbed hydrogen sulphide to react with said alkaline earth to form thiosulphate present in amount less than that required for the liberation of free sulphur.

5. The process of purifying a gas from hydrogen sulphide which comprises subjecting said gas to intimate contact with an aqueous suspension of an alkaline earth and a cobalt compound capable of causing the absorbed hydrogen sulphide to react with said alkaline earth to form thiosulphate.

6. The process of purifying a gas from hydrogen sulphide which comprises subjecting said gas to intimate contact with an aqueous suspension of an alkaline earth and containing cobalt sulphide in amount less than the amount required for the liberation of free sulphur.

7. The process of purifying a gas from hydrogen sulphide which comprises subjecting said gas to intimate contact with a 1 to 3% aqueous suspension of lime, containing 0.01% of cobalt.

8. The process of purifying gas which comprises subjecting said gas to intimate contact with a heated suspension of an alkaline earth and a compound of a metal of the group consiting of iron, nickle and cobalt, present in amount sufficient to cause absorbed hydrogen sulphide to react with said alkaline earth to form thiosulphate but insufficient to cause the liberation of free sulphur.

9. The process of purifying gas from hydrogen sulphide which comprising washing said gas with a solution of sodium carbonate, subsequently revivifying said solution out of contact with said gas by means of a current of air caused to pass through said solution, and subsequently purifying said air by washing it with a suspension of an alkaline earth.

10. The process of purifying gas from hydrogen sulphide which comprises washing said gas with a solution of sodium carbonate, subsequently revivifying said solution out of contact with said gas by means of a current of air caused to pass through said solution and subsequently purifying said air by washing it with a suspension of an alkaline earth and a compound of a metal of the group consisting of iron, nickel and cobalt and capable of causing the formation of thiosulphate as end product.

11. The process of removing hydrogen sulphide from a gas containing hydrogen sulphide and carbon dioxide, which comprises separating the hydrogen sulphide from the bulk of the carbon dioxide and fixing the separated hydrogen sulphide by means of an aqueous suspension of an alkaline earth and a compound of a metal of the group consisting of iron, nickel and cobalt and capable of accelerating the conversion of sulphide to thiosulphate.

12. The process of removing hydrogen sulphide from a gas containing hydrogen sulphide and carbon dioxide, which comprises separating the hydrogen sulphide from the bulk of the carbon dioxide and fixing the separated hydrogen sulphide by means of a lime suspension carrying a cobalt compound in amount sufficient to promote the formation of thiosulphate but insufficient to promote the liberation of free sulphur.

13. The process of purifying a gas from hydrogen sulphide which comprises subjecting said gas to intimate contact with a 1 to 3% aqueous suspension of lime and containing less than 0.1% of a compound of a metal of the group consisting of iron, nickel and cobalt.

14. The process of purifying gas from hydrogen sulphide which comprises washing said gas with a solution of sodium carbonate, substantially revivifying said solution out of contact with said gas by means of a current of air caused to pass through said solution, and subsequently purifying said air by washing it with a suspension of an alkaline earth metal compound and containing a compound of a metal of the group consisting of iron, nickel and cobalt in amount sufficient to promote the formation of alkaline earth metal thiosulphate but insufficient to promote the liberation of free sulphur.

In testimony whereof, I have hereunto subscribed my name this 6th day of July, 1926.

FREDERICK W. SPERR, Jr.